May 11, 1954 J. L. V. BONNEY, JR 2,678,125

EXTENSIBLE CONVEYER

Filed Dec. 23, 1949

11 Sheets-Sheet 1

INVENTOR
JOHN L.V. BONNEY JR
BY Jerome R. Cox
ATTORNEY

EXTENSIBLE CONVEYER

Filed Dec. 23, 1949 11 Sheets-Sheet 2

INVENTOR
JOHN L.V. BONNEY JR.
BY Jerome R. Cox
ATTORNEY

EXTENSIBLE CONVEYER

Filed Dec. 23, 1949 11 Sheets-Sheet 3

INVENTOR.
JOHN L.V. BONNEY JR.
BY
Jerome R. Cox
ATTORNEY

INVENTOR.
JOHN L. V. BONNEY JR.
BY
Jerome R. Cox
ATTORNEY

May 11, 1954 J. L. V. BONNEY, JR 2,678,125

EXTENSIBLE CONVEYER

Filed Dec. 23, 1949 11 Sheets-Sheet 5

INVENTOR
JOHN L.V. BONNEY JR.
BY
Jerome R. Cox
ATTORNEY

May 11, 1954 J. L. V. BONNEY, JR 2,678,125

EXTENSIBLE CONVEYER

Filed Dec. 23, 1949 11 Sheets-Sheet 6

INVENTOR
JOHN L.V. BONNEY JR.
BY Jerome R. Cox
ATTORNEY

EXTENSIBLE CONVEYER

INVENTOR
JOHN L.V. BONNEY JR.
BY Jerome R. Cox
ATTORNEY

INVENTOR.
JOHN L.V. BONNEY JR.
BY
Jerome R. Cox
ATTORNEY

EXTENSIBLE CONVEYER

Filed Dec. 23, 1949

INVENTOR
JOHN L. V. BONNEY JR.
BY Jerome R. Cox
ATTORNEY

INVENTOR.
JOHN L.V. BONNEY JR.
BY
Jerome R. Cox
attorney

INVENTOR.
JOHN L.V. BONNEY JR.
BY
Jerome R. Cox
ATTORNEY

Patented May 11, 1954 2,678,125

UNITED STATES PATENT OFFICE 2,678,125

EXTENSIBLE CONVEYER

John L. V. Bonney, Jr., Columbus, Ohio

Application December 23, 1949, Serial No. 134,827

11 Claims. (Cl. 198—139)

The invention disclosed in this application relates to conveyors. It is illustrated by several embodiments of the invention consisting of conveyors especially adapted for conveying coal from continuously operating coal mining machines.

One of the objects of my invention is the construction of a conveyor which can be extended efficiently for two or many more times the contracted length.

A further object of the invention is the provision of means for taking up the slack in the belt of such a conveyor when the conveyor is contracted.

The above and other objects and features of my invention will become apparent from a consideration of the following specification in connection with the accompanying drawings illustrating several embodiments of my invention.

Figure 1:
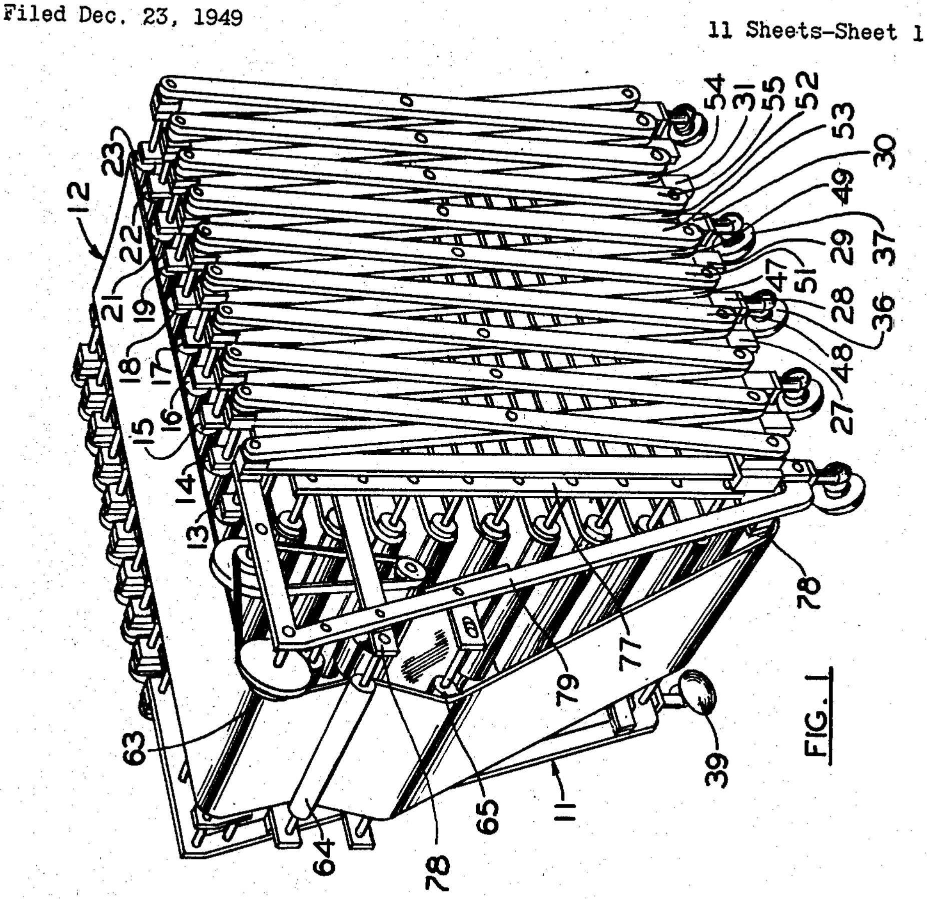
Fig. 1 is a view in perspective of a conveyor constructed according to my invention.
Figure 4:
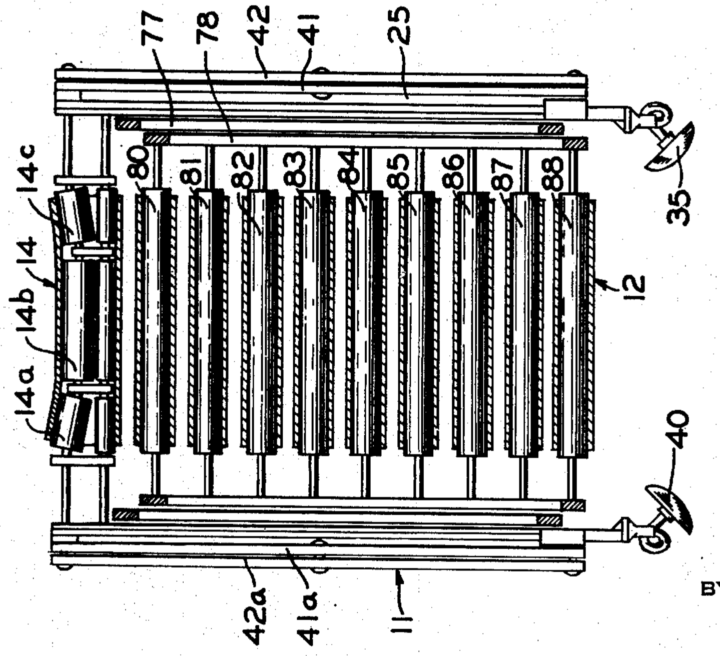
Fig. 4 is a view in vertical section taken substantially on the line 4—4 of Fig. 2.

Referring now to Figs. 1 to 6 inclusive for an explanation and description of the conveyor shown therein, it may be seen (referring especially to Figs. 1 and 2) that I have disclosed a conveyor 11 capable of being compacted or contracted and consisting of a belt 12 supported on a plurality of roller assemblies such as 13, 14, 15, 16, 17, 18, 19, 21, 22 and 23. Each of these roller assemblies may comprise three rollers such as, for example, the three rollers 14a, 14b, and 14c, of the assembly 14 shown in Fig. 4. The roller assemblies 13 to 19 and 21 to 23 inclusive are carried at the upper end of upright frame members 24, 25, 26, 27, 28, 29, 30, 31, 32, and 33 respectively. Some of these upright frame members are mounted on rollers such as the rollers 34, 35, 36, 37, and 38. The upright members 24 to 33 inclusive are each secured to the next adjacent upright member by means of a pair of levers pivoted at the central point thereof intermediate their ends such as the levers 41, 42, 43, 44, 45, 46, 47, 48, 49, 51, 52, 53, 54, 55, 56, 57, 58 and 59 which all together form a lazy tongs system of levers. Thereby the end of the conveyor may be extended or retracted to elongate and to compact or contract the conveyor.

Figure 2:
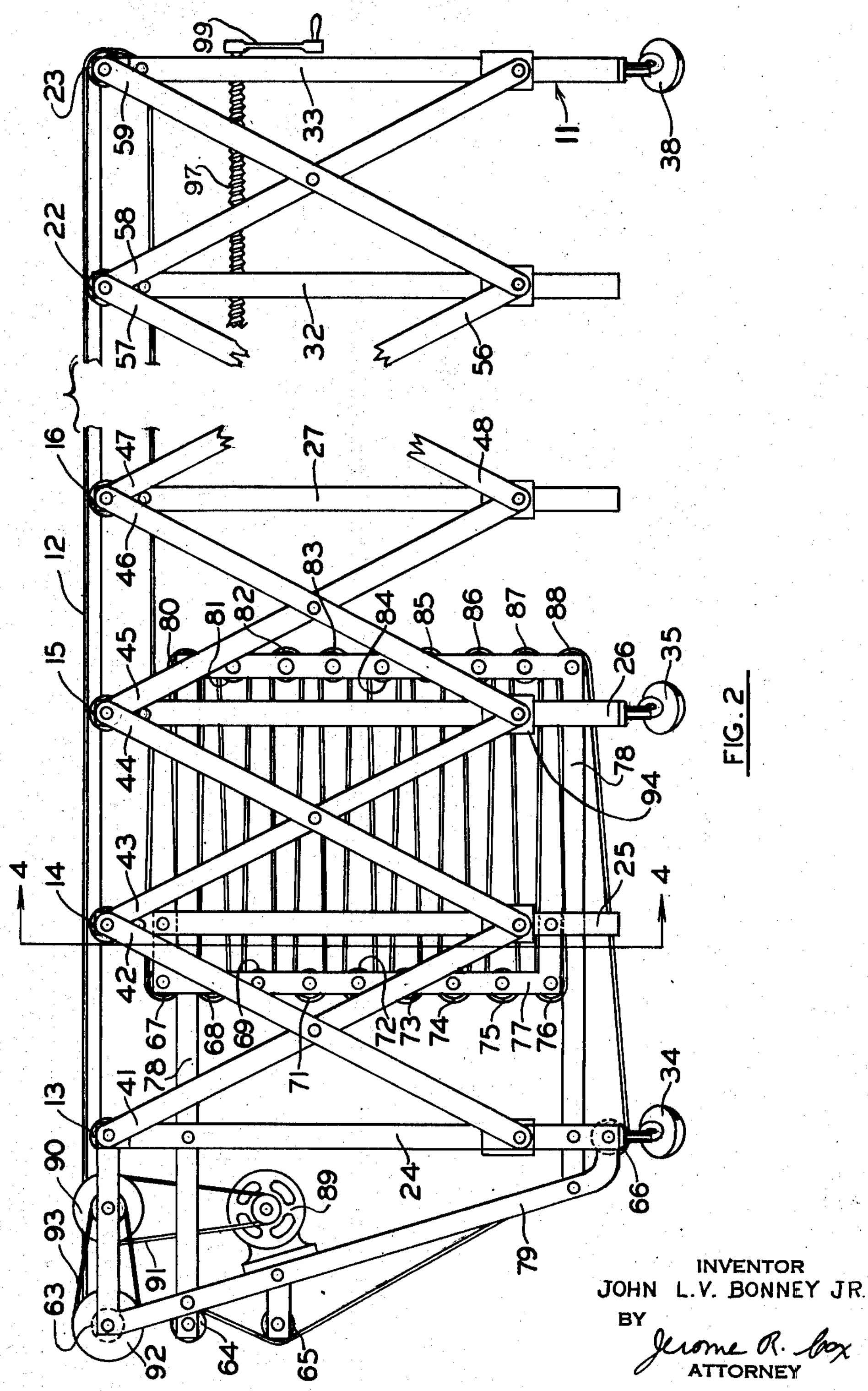
Fig. 2 is a view in side elevation of the conveyor shown in Fig. 1 showing the conveyor partially extended, but having a relatively long intermediate fragment broken away in order that I may show the conveyor on a fairly large scale on a single sheet of drawings.
Figure 3:
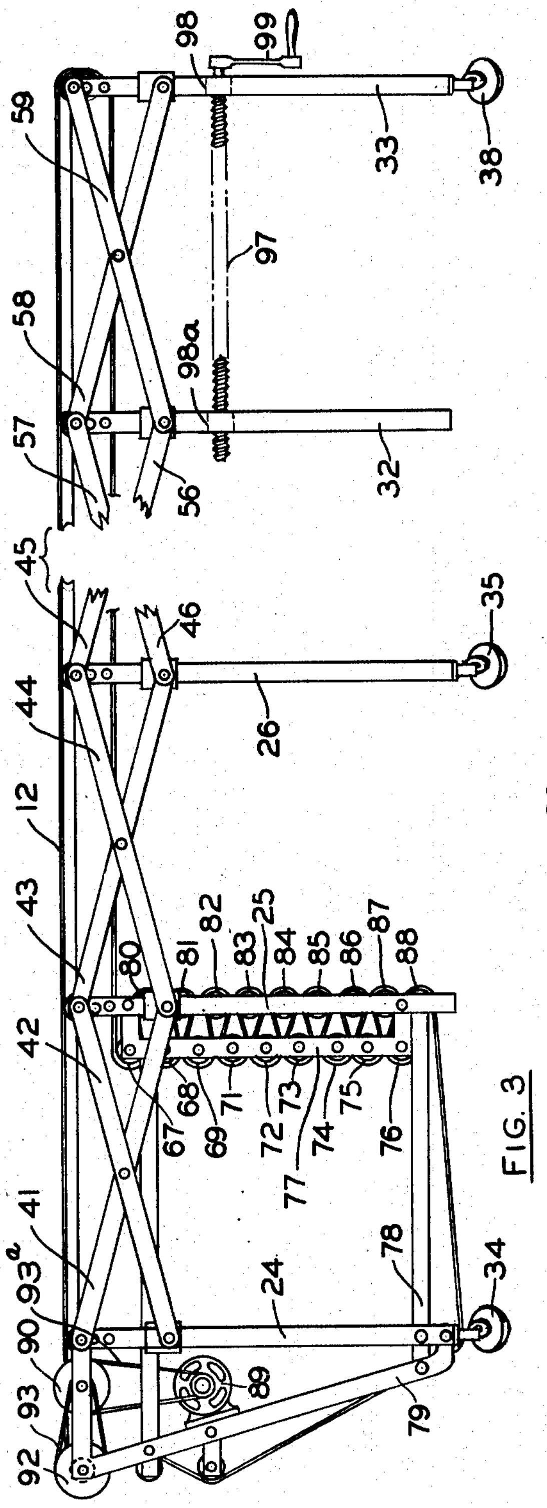
Fig. 3 is a view in side elevation similar to Fig. 2 but showing the conveyor fully extended and having an even longer intermediate fragment broken away for the same reason.

Additional rollers are also provided for the belt 12. Thus as seen in Fig. 2, there is provided an end support roller 63, take-up rollers 64 and 65, return roller 66, and nine movable idler rollers 67, 68, 69, 71, 72, 73, 74, 75, and 76. These idler rollers are carried by a frame 77 which is secured to the upright frame member 25. Therefore the nine idler rollers 67 to 76 move with the member 25. I provide also nine fixed idler rollers carried by a frame generally designated 78 (see Figs. 2, 3, and 4) secured to a member 79 forming a part of the main frame and to the upright member 24. As may be seen, these fixed idler rollers are designated 80, 81, 82, 83, 84, 85, 86, 87, and 88. The frame 77 is cantilever, is secured to the upright 25, and its unsupported end extends from the upright 25 toward the upright 24. The frame 78 is also cantilever, is in effect secured to the upright 24 and its unsupported end extends in the opposite direction to the direction of the unsupported end of the frame 77. Therefore, these frames normally overlap, but as the conveyor is extended, the unsupported ends of the two frames 77 and 78 move toward each other carrying the idler rollers also toward each other until when the conveyor is fully extended (as in Fig. 3) the idler rollers approach very near to each other. Therefore when the conveyor is fully extended the idler portion of the belt passing over the two sets of idler rollers becomes very short, relatively speaking, and the operative part of the belt is correspondingly increased in length. In other words the frame 77 and the frame 78 are maintained in spaced apart side by side (substantially parallel) relationship. Thus, movement of the upright 25, as the conveyor is either extended or contracted, causes frame 77 and the idler rollers 67 to 76 to be shifted in position relative to idler rollers 80 to 88. The rollers 67 to 76 are shifted toward the rollers 80 to 88 as the conveyor is extended as illustrated in Figs. 2 and 3. When the conveyor is contracted as illustrated in Fig. 1, the rollers 67 to 76 are shifted in the opposite direction (i. e. away from the rollers 80 to 88). This shifting of the position of the rollers 67 to 76 thus provides for maintaining substantially constant tension in belt 12, taking up the slack when the conveyor is contracted and letting out the belt when the conveyor is extended.

Any suitable means of extending and contracting the conveyor may be employed, but I have shown a screw 97 journaled in bearings 98 and 98a and arranged to be turned by a handle 99 for contracting or extending the distance between the two uprights 32 and 33 and consequently, through the lazy tong linkage, thus contracting or extending the distance between all of the other uprights and all of the rest of the lazy tong linkage. Any other desired suitable means could be employed.

The belt may be driven by hydraulic, electric, or other power means. I have shown an electric motor 89 driving reducing pulleys 90 and 92 by means of the belts 91 and 93. The pulley 92 drives the roller 63 and through it drives the belt 12.

Figure 6:
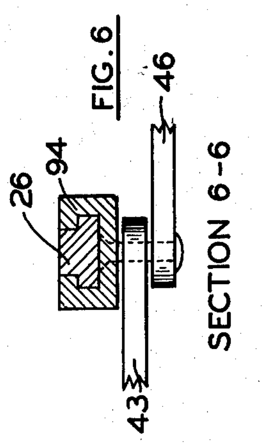
Fig. 6 is a fragmentary view in horizontal section taken substantially on the line 6—6 of Fig. 5.
Figure 5:
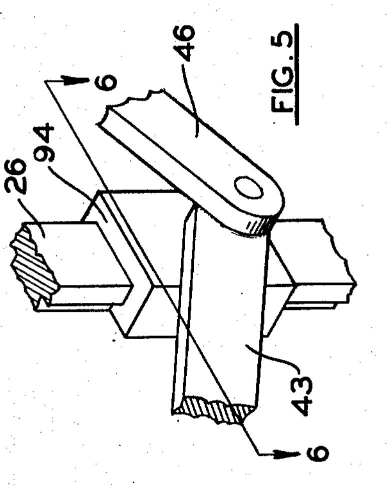
Fig. 5 is a fragmentary perspective view on an enlarged scale showing the details of the sliding connection between the lower ends of two of the lazy tongs members and one of the upright members.

As shown in Figs. 5 and 6, the lazy tongs levers are connected to the upright frame members by means of sliding brackets. Thus, for example, the upright member 26 has a bracket 94 which slides on the frame member 26. Pivotally secured to the bracket 94 are the lower ends of the lazy tong members 43 and 46.

Figure 8:
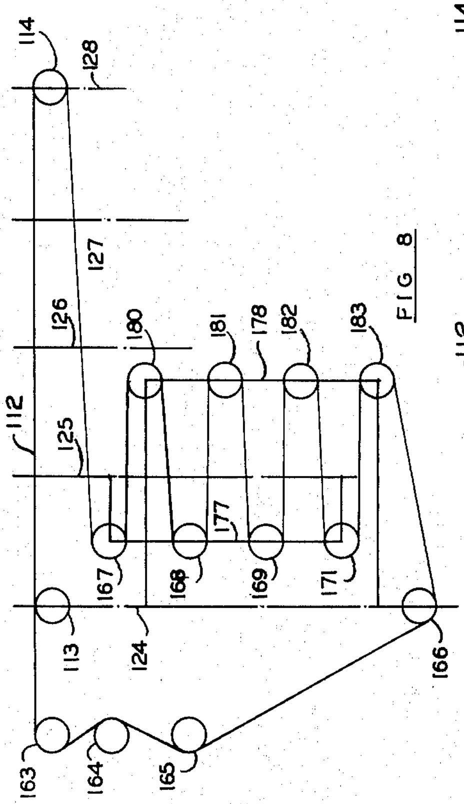
Fig. 8 is a view similar to Fig. 7 showing the relationship of the rollers and belt when the structure of Fig. 7 is in a partially extended condition.
Figure 9:
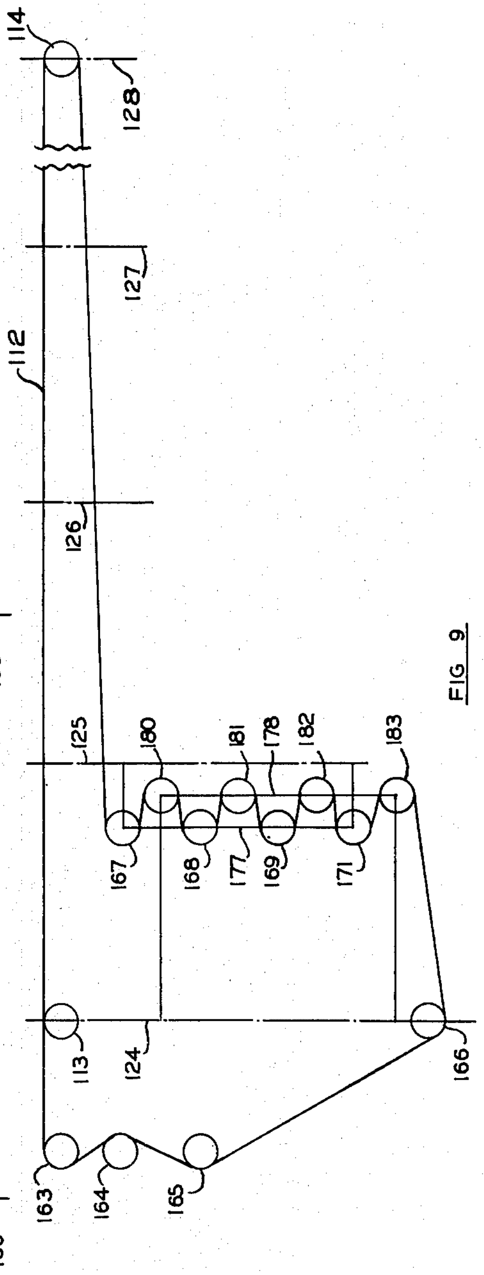
Fig. 9 is a view similar to Figs. 7 and 8 showing the relationship of the parts when the structure is substantially fully extended.
Figure 7:
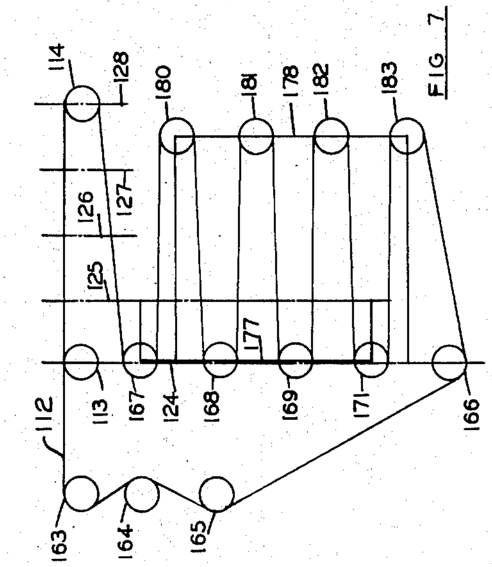
Fig. 7 is a diagrammatic view illustrating the relationship of the belt and rollers of a conveyor similar to the conveyor shown in Figs. 1 to 6 inclusive but having a lesser number of rollers, the conveyor being shown in the compacted position.

The theory of the belt extension may perhaps be explained more easily in connection with Figs. 7, 8 and 9, which diagrammatically show a belt and rollers of a similar conveyor which, however, has only four rollers in the set of movable or floating rollers and four rollers in the set of fixed rollers. Inasmuch as the conveyor disclosed in Figs. 7 to 9, inclusive, has only four rollers it may be extended only to approximately four times its compacted length. The conveyor of Figs. 1 to 6, inclusive, however, having nine rollers in each set, and having ten uprights and nine pairs of lazy tongs can be extended to approximately nine times its compacted length. Referring now to Figs. 7 to 9, inclusive, it may be seen that the belt 112 is carried on rollers 113 and 114 and goes around a support roller 163, take-up rollers 164 and 165, return roller 166, idler rollers 167, 168, 169 and 171, and fixed idler rollers 180, 181, 182 and 183. When the conveyor is contracted as shown in Fig. 7 the rollers 167, 168, 169 and 171 are spaced relatively far from the rollers 180, 181, 182 and 183. As the conveyor is extended, as shown in Figs. 8 and 9, movement of the far end of the conveyor indicated by the upright 128 through the connection by means of the lazy tongs moves proportionately the uprights 125, 126, and 127 away from the upright 124. The movement of the upright 125 moves with it the frame 177 while the frame 178 is maintained substantially stationary due to its connection with the upright 124. As the conveyor becomes fully extended, the rollers 167, 168, 169 and 171 mounted on the frame 177 approach relatively close to the rollers 180, 181, 182 and 183 mounted on the frame 178. Inasmuch as there are four movable idler rollers and four fixed idler rollers there are eight lengths of the belt absorbed thereby and the belt is effectively lengthened by eight times the distance that the rollers approach toward each other. Inasmuch as there is an operative portion of the belt as well as a return portion thereof (i. e. the belt is doubled on itself), the conveyor is effectively lengthened by four times the distance that the rollers approach toward each other. Inasmuch as in the contracted condition of the conveyor, shown in Fig. 7, the rollers 167, 168, 169 and 171 are spaced from the rollers 180, 181, 182 and 183 substantially the contracted length of the conveyor and as in the extended condition, as shown in Fig. 9, the rollers approach approximately adjacent to each other, the conveyor in Fig. 9 extends for a distance of approximately four times the length of Fig. 7. Inasmuch as the uprights 124 and 125 are connected in the lazy tongs system, they are spaced from each other (in any condition of the conveyor) proportionately to the length of the conveyor. That is to say, the uprights 124 and 125 are spaced from each other approximately one-fourth of the length of the conveyor regardless of the distance that it is extended.

Assuming that it is desired to construct a conveyor which may be extended to $n$ times its contracted length, I would provide $n$ rollers on the frame 77 (or 177) and $n$ rollers on the frame 78 (or 178). A lazy tongs arrangement would be constructed preferably with $n+1$ upright members (or some even multiple of $n+1$). Frame 77 (or 177) would be secured at a point nearer the fixed end of the conveyor on the lazy tongs linkage at a point $1/n$ of the distance toward the movable end and may extend toward the fixed end a distance of $1/n$ of the length of the compacted conveyor. The frame 78 (or 178) is secured to the fixed end of the conveyor. It extends toward the movable end a distance of greater than $(n-1)/n$ of the compacted conveyor and not more than the length of the compacted conveyor. Thus in Figs. 7–9, frame 177 is ½ inch long and frame 178 is 1¾ inches long. Therein the uprights 124, 125, 126, 127 and 128 are spaced from each other equal distances in each figure. In Fig. 7, this distance is ½ inch; in Fig. 8, it is 1 inch; and in Fig. 9 it is 2 inches. The length of the conveyor in Fig. 7 is 2 inches plus the non-extensible portion and in Fig. 9, it is 8 inches plus the non-extensible portion. The roller of frames 177 and 178 are approximately 1¾ inches apart in Fig. 7 and approximately ¼ inch apart in Fig. 9.

The operation of the embodiment of my invention, shown in Figs. 1 to 6, inclusive, is fairly obvious. The conveyor is, as will of course be understood, useful for conveying different commodities. When used for conveying coal from an automatic coal mining machine, the "movable" end (right hand end in Figs. 1, 2 and 3) is placed adjacent to the coal mining machine, and the conveyor is compacted to the condition shown in Fig. 1. A suitable receptacle is placed adjacent the "fixed" end (i. e. the left hand end). The mining machine delivers the coal to the belt 12 at the "movable" end and as the belt 12 is driven in a general counter-clockwise direction by the motor 89, the coal is delivered by the upper layer of the belt to the receptacle. As the mining machine cuts into the coal the mining machine follows up the cut. The movable end of the conveyor may be secured to the mining machine and the fixed end secured adjacent the receiver. Then as the mining machine moves it stretches the conveyor to the desired length automatically. However, if desired, other means for extending the conveyor may be provided. Thus for example, the handle 99 may be utilized to spread apart the uprights 32 and 33 and through the lazy tong linkage spread also the other uprights including the members 24 and 25. Because the frame 77 is secured to the upright 25 and the frame 78 is secured to the upright 24, this causes the rollers 67 to 76 to approach the rollers 80 to 88 thus shortening the loops of the belt 12 between them and compensating for the lengthening of the upper length of said belt 12 in exact degree as explained above. After the extreme length of the conveyor has been reached, the conveyor may be moved and contracted preparatory to another follow up operation. In contracting the conveyor the rollers 67 to 76 move away from the rollers 80 to 88, thus lengthening the loops and taking up all slack in the belt 12.

While in the above description the right end is designated as "movable" and the left end is designated as "fixed," it will be understood that if desired, the conveyor may be reversed, the belt driven in the opposite direction, and the right end conveniently fixed and the left end with the rollers 63, 64, 65 and 66 moved with the coal mining machine.

The conveyor illustrated diagrammatically in Figs. 7, 8 and 9 is operated in exactly the same manner, but can only be extended approximately four times its contracted length.

Referring now to Figs. 10 to 17, inclusive, which illustrate another embodiment of my invention, it may be seen that the device illustrated there consists of a belt conveyor also specially designed for continuously operating coal mining machines, but also obviously useful for other purposes. Conveyors constructed according to this design can also be built to be extended 2, 3, 4, or more times the compacted length. The ratio of extended to compacted length in this design depends upon the number of turns of the conveyor belt and is equal to the number of idler rollers such as the rollers 280, 281, 282 and 283 (Figs. 11 and 12) shown at the "fixed" (right) end of the conveyor. There is also another group of idler rollers which may be designated as "floating" rollers. These are shown as rollers 267, 268 and 269 in Figs. 11 and 12 at the "movable" end of the conveyor. There is one less roller in this group than in the group at the "fixed" end. The ratio of extended length to compacted length is thus equal to the number of floating idler rollers of the conveyor plus 1.

Figures 12, 13:
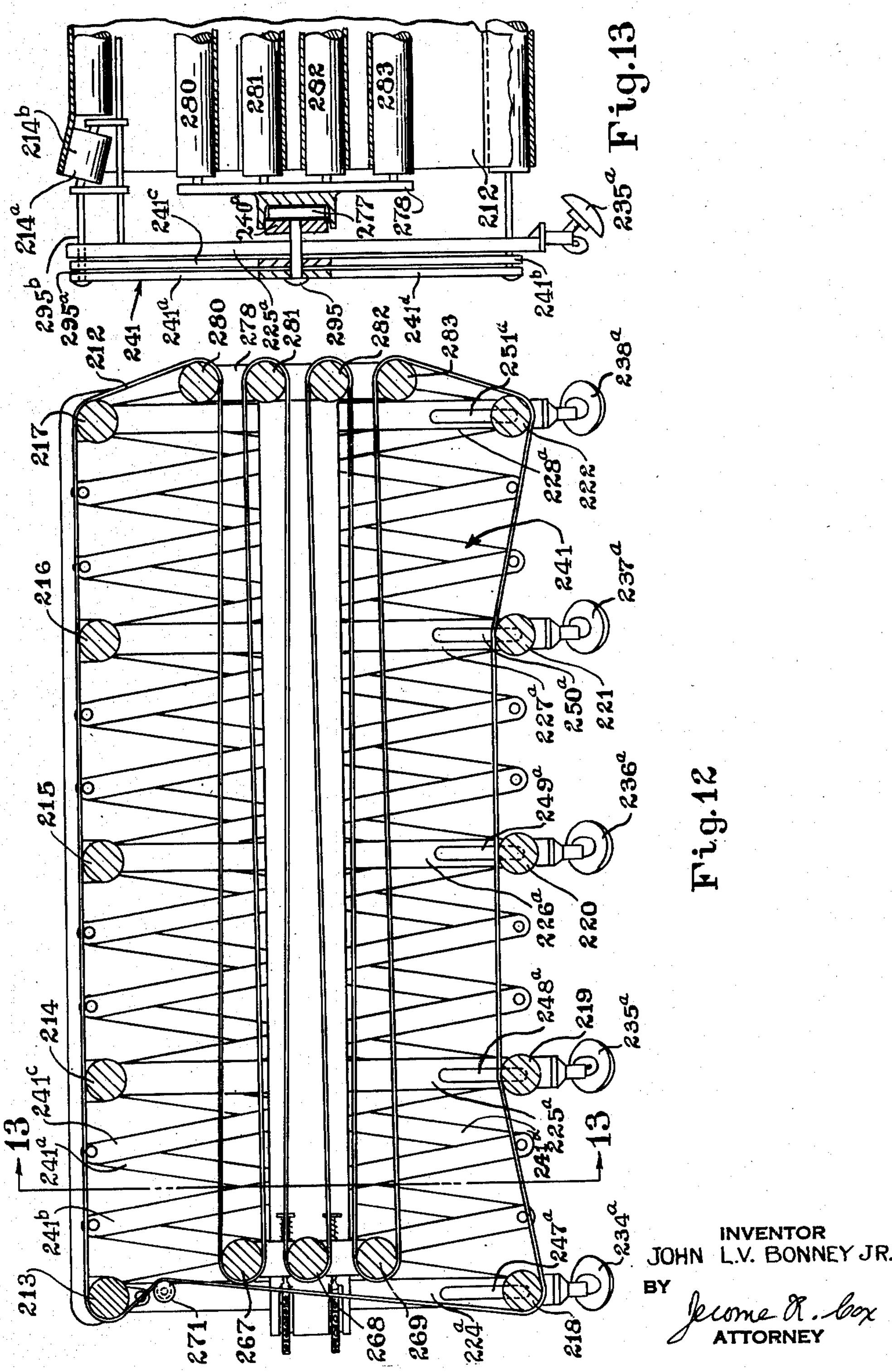
Fig. 12 is a view in longitudinal vertical section of the conveyor illustrated in Fig. 10.
Fig. 13 is a view in vertical section taken substantially on the line 13—13 of Fig. 12, showing however, only one-half of the conveyor inasmuch as the opposite section is a substantial mirror duplicate of the portion shown.
Figures 14, 15, 16, 17:
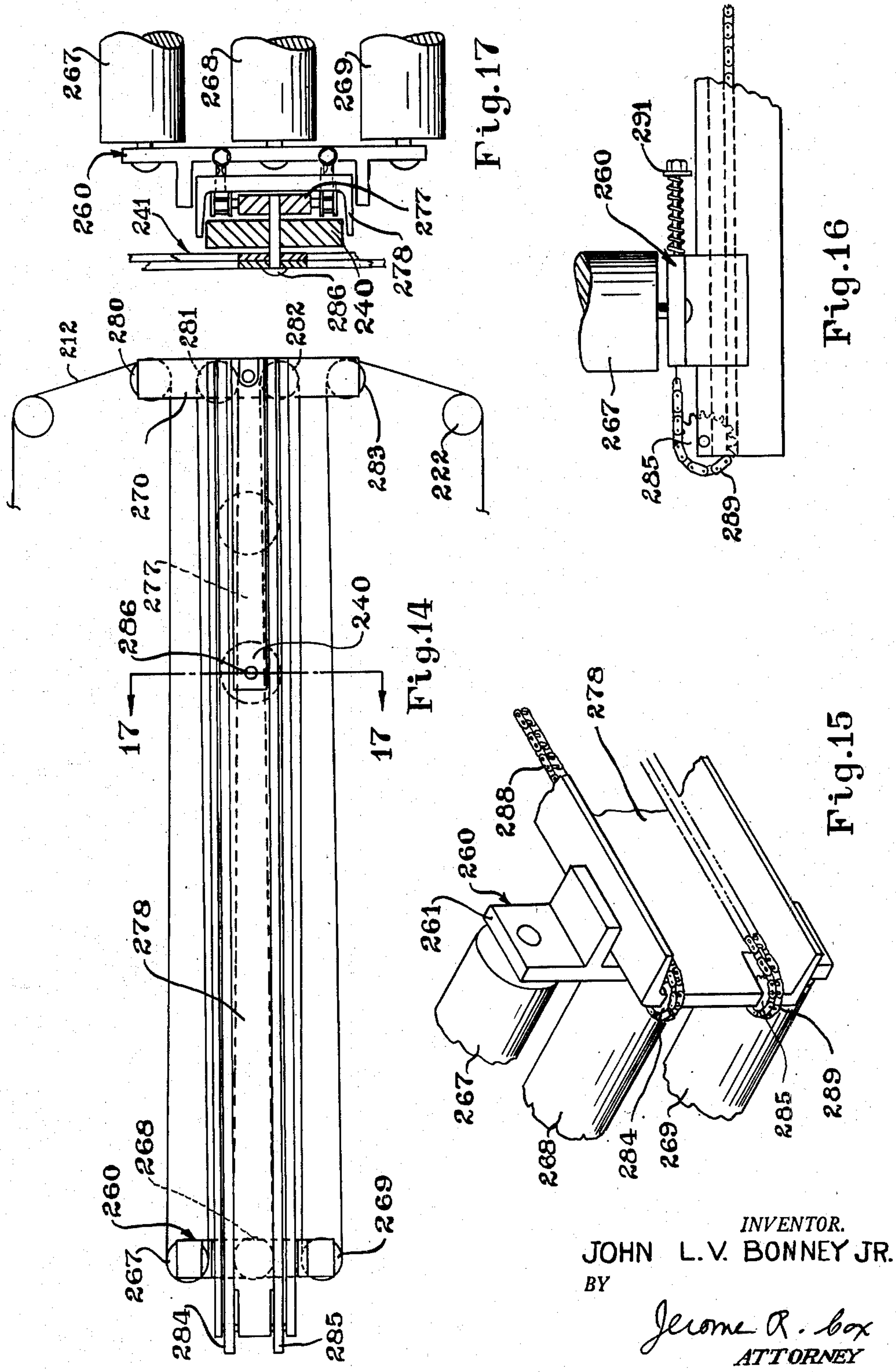
Fig. 14 is a fragmentary partially diagrammatic view in elevation of a portion of the conveyor shown in Figs. 10 to 13 inclusive.
Fig. 15 is a fragmentary view on an enlarged scale illustrating the relationship of one of the frame members to the chain controlling the position of the take-up idlers.
Fig. 16 is a fragmentary view in horizontal section further illustrating the cooperation of the chain with the members.
Fig. 17 is a fragmentary view in vertical section taken substantially on the line 17—17 of Fig. 14.

The conveyor proper comprises a conveyor belt 212, the supporting rollers therefor and the two groups of idler rollers over which the conveyor belt passes in order to take up slack when the conveyor is wholly or partially compacted. The supporting and idler rollers are supported upon a frame made up of a plurality of uprights connected by a lazy tong extensible arrangement. The lazy tong levers are mounted upon the vertical supports which are in turn carried upon casters. The lazy tong linkage is made up of a plurality of levers pivoted at their central points to each other by pins such as 295 (Fig. 13) which extend through holes formed in the lazy tongs levers. The ends of the levers are connected to one of the next adjacent pair of levers by similar pins such as, for example, pin 295*a*. These last mentioned pins (corresponding to 295*a*) may also (and at intervals must) extend through similar holes formed (at approximately the axis of the support rollers) through the upper ends of the upright members. As shown, the pin 295 extends through the midpoint of the levers 241*a* and 241*b* and carries a roller 240*a* which is guided by flanges of the T-member 278. The pin 295*a* extends through the upper end of levers 241*a* and 241*c*. Similar pins extend through the other lazy tongs levers. Some of these pins extend through the upper ends of the upright members. As shown in Fig. 13, the pin 295*b* extends through the upper end of upright member 225*a*. Similar pins or rivets secure the midpoints and upper ends of all of the other lazy tongs levers. The belt 212 may be driven by a hydraulic or an electric means or by any other source of power. When in its extended condition the belt passes over the top support rollers and under the bottom support rollers with very little excess to be absorbed.

Figure 11:
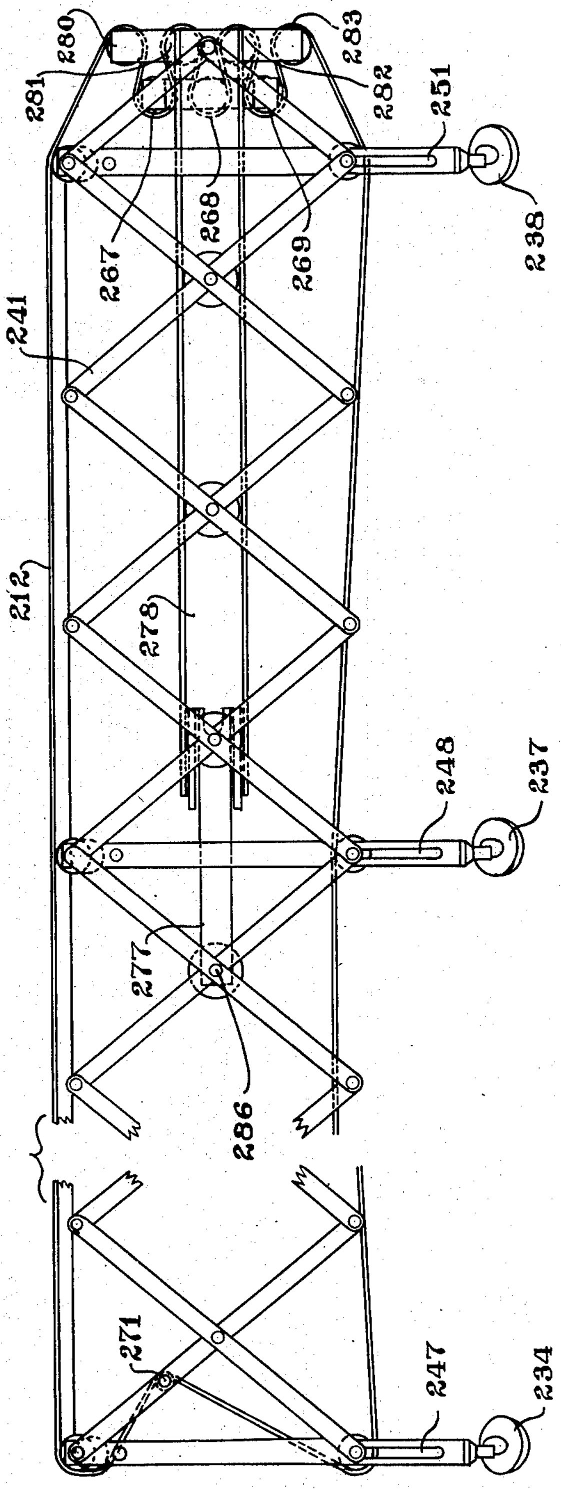
Fig. 11 is another view in side elevation of the conveyor shown in Fig. 10 having portions broken away and showing the conveyor substantially fully extended.

As suggested, means are provided for maintaining uniform tension in the belt whether the conveyor is wholly extended or partially or wholly contracted. This means comprises the series of rollers at the fixed end of the conveyor (i. e. the fixed rollers 280, 281, 282 and 283) and the series of floating rollers (i. e. rollers 267, 268 and 269) which may at times be at the fixed end of the conveyor, may at other times be at the movable end of the conveyor, and may at other times be intermediate those positions. The surplus portion of the belt passes (as may be seen well in Fig. 12) over one of the fixed rollers at the right end of the conveyor, then over one of the floating rollers (at the opposite end of the conveyor in Fig. 12), back to the fixed end and over one of the fixed rollers, etc. As shown in Fig. 12, there are three floating rollers and four fixed rollers. Thus counting the upper conveying portion of the belt and the lower return portion of the belt and the six intermediate portions between the idler pulleys there are shown in Fig. 12 approximately eight lengths of the belt extending the length of the conveyor. In Fig. 11 there are shown only substantially two lengths of the belt (i. e. the upper working surface and the lower return surface) because the floating rollers have moved to the fixed end and there is little length of the belt absorbed by them. Thus in Fig. 12 the conveyor is compacted to approximately one-four of the extended length thereof shown in Fig. 11.

The supporting frame for the rollers over which the belt passes comprise (see Fig. 10) the upright frame members 224, 225, 226, 227 and 228 and the upright frame members 224*a*, 225*a*, 226*a*, 227*a* and 228*a* on the opposite side of the conveyor (see Fig. 12). These upright members are all connected by lazy tongs arrangements on each side, designated generally as 241. At the lower ends of each of the upright members 224, 225, 226, 227, 228, 224*a*, etc. are the rollers 218, 219, 220, 221, and 222 respectively which are carried by pins or rivets extending through the lower pivots of the lazy tong members. These pins or rivets also extend through slots 247, 248, 249, 250, 251, 247*a*, 248*a*, 249*a*, 250*a* and 251*a* formed in the lower ends of the upright members 224, 225, 226, 227, 228, 224*a*, 225*a*, 226*a*, 227*a* and 228*a*. The frame is supported by casters such as 234, 235, 236, 237, 238, 234*a*, 235*a*, 236*a*, 237*a* and 238*a*.

The mechanism for maintaining the belt taut regardless of whether the belt is in its extended condition, is in its compacted condition, or is in an intermediate condition, comprises a pair of support arms, a chain, a chain sprocket, and connections between them. The support arms (see Figs. 11, 14, 15, 16 and 17) are designated as a chain support arm 277, and a T-shaped support arm 278. The T-shaped support arm 278 is fastened at the fixed end (right end of the conveyor) and also carries the four fixed idler return rollers 280, 281, 282 and 283. Its opposite end is free and is not secured to the conveyor except through its fixed end. The arm is, however, supported throughout its length by rollers such as the rollers 240 and 240*a*. The end of the arm opposite the fixed end carries the chain sprockets 284 and 285 (see Figs. 15 and 16). This T-shaped support arm 278 extends from the fixed end of the conveyor towards the opposite free end for one-fourth ($1/n$ where $n$ equals the number of rollers at the fixed end) of the length of the fully extended conveyor.

As stated above, at its free end it carries the sprockets 284 and 285.

The chain support arm 277 is secured to an intermediate portion of the lazy tongs part of the frame as, for example, at 286. The point 286 is fixed so that it is always $1/(n-1)$ of the distance from the fixed end of the conveyor toward the movable end. In Figs. 10 to 17 this distance is $\frac{1}{3}$ of the distance from the fixed end of the conveyor. The chain support arm 277 is secured to the lazy tongs and thus regardless of whether the conveyor is in its extended condition, contracted or compacted condition, or is in an intermediate condition, the same ratio holds. The length of the arm 277 is $1/n^2-n)$ (e. g. $\frac{1}{12}$) of the length of the conveyor when the conveyor is in its extended condition and extends from its secured point toward the fixed end of the conveyor. The T-shaped arm is one-fourth ($1/n$) of the length of the extended conveyor. Inasmuch as the chain support arm is one-twelfth of the extended length, the total of the lengths of the two arms ($\frac{1}{4}$ plus $\frac{1}{12}$) is one-third of the length. As stated above, the point at which the support arm 277 is secured is a point one-third of the length of the conveyor from the point at the fixed end of the conveyor at which the T-section is fixed. Thus when the conveyor is extended, the free end of the support arm 277 substantially coincides with the free end T-shaped support arm 278.

When the conveyor is compacted, however, the free ends of the two arms 277 and 278 overlap and move apart. Chains 288 and 289 are provided and one end of each of the chains 288 and 289 are secured to the free end of chain support arm 277. Intermediate portions of the chains pass over the sprockets 284 and 285. The sprockets 284 and 285 are secured to the free end of the T-shaped arm 278. The ends of the chains opposite to the ends secured to the arm 277 are secured to a unit 260 which consists of the floating idler rollers 267, 268 and 269, and the support 261 therefor. When the ends of the arms 277 and 278 move apart, the ends of the chains 288 and 289 are pulled over the sprockets 284 and 285 and as a result the idler rollers 267, 268 and 269 are moved from the fixed end of the conveyor toward the movable end thereof so that when the conveyor is fully compacted, the floating rollers are at the movable end of the conveyor.

As the conveyor is compacted the end sections of the conveyor become wider vertically due to the lazy tongs structure of the frame. In order to compensate partially for this differential another idler roller 271 is provided at the movable (left) end of the conveyor belt, being carried by one of the levers of the lazy tong support. This idler compensates except as the sine of the angle of the lazy tong levers varies from the co-sine thereof. In order to compensate for this slight differential and take-up all slack in the chains the ends of the chains 288 and 289 are connected (see Fig. 16) to the floating idler roller unit 260 through relatively heavy springs such as spring 291.

The ratio of compacted to extended length may be varied. If $n$ is considered as the number of fixed idler pulleys at the fixed end of the conveyor then the number of floating pulleys is always $n-1$. In the illustration there are four fixed idler pulleys and the number of floating idler pulleys is therefore $n-1$ or 3. The point at which the T-shaped member 278 is fixed to the conveyor is always at the fixed end of the conveyor. The length of the T-shaped arm 278 is always $1/n$ of the length of the conveyor when fully extended and is equal to the length of the conveyor when compacted. In the illustration it is one-fourth of the fully extended length of the conveyor. The chain support arm is secured to the frame at a point which is always $1/(n-1)$ of the distance from the fixed end toward the movable end thereof. The length of the chain is always substantially the length of the compacted conveyor which is approximately equal to the length of the T-shaped arm. The length of the chain support arm is equal to $1/(n^2-n)$ (i. e. $1/(n-1-1/n)$) of the length of the fully extended conveyor. These ratios are true in all cases regardless of the number of turns of the belt and regardless of the number of idler pulleys.

Thus, if there is constructed a conveyor of 120 feet and it is desired to compact or contract this into 20 feet there would be required six idler pulleys and five floating idler pulleys. The floating idler pulleys would be secured to a chain slightly over 20 feet in length which would pass over a chain sprocket secured to the end of a T-arm support 278. The T-arm support would be secured at the fixed end of the conveyor and would extend toward the opposite end a distance of one-sixth of 120 or 20 feet. The opposite end of the chain would be secured to the floating end of the chain support arm 277 which would be secured to the conveyor at a point which is always one-fifth of the distance from the fixed end toward the floating end. In the extended position of the conveyor the chain support arm would be fixed at a point 24 feet from the fixed end and in the compacted position would be fixed at a point 4 feet from the fixed end. The chain support arm would be 4 feet in length and its free end in the compacted position would be approximately at the fixed end of the conveyor.

In a conveyor which it is desired to compact to one-half of its length, there would be two fixed idler rollers and one floating idler roller and both of the support arms 277 and 278 would be equal in length to one-half of the length of the conveyor in its extended position as would also the chain which would have one end secured to the chain support arm and the other end secured to the single return floating idler. The T-support arm 278 would be secured to the fixed end of the conveyor and the chain support arm 277 would be secured to the movable end of the conveyor.

If it is desired to compact the conveyor to one-third of its length, it would be necessary to have three fixed idler rollers and two floating idler rollers; the T-section 278 would be one-third of the length of the conveyor in its extended condition; and the chain support arm would be one-sixth of the length of the extended conveyor. The latter arm would be secured at the midpoint of the conveyor. Any other ratio of compacted to extended length would be similarly computed.

Figure 19:
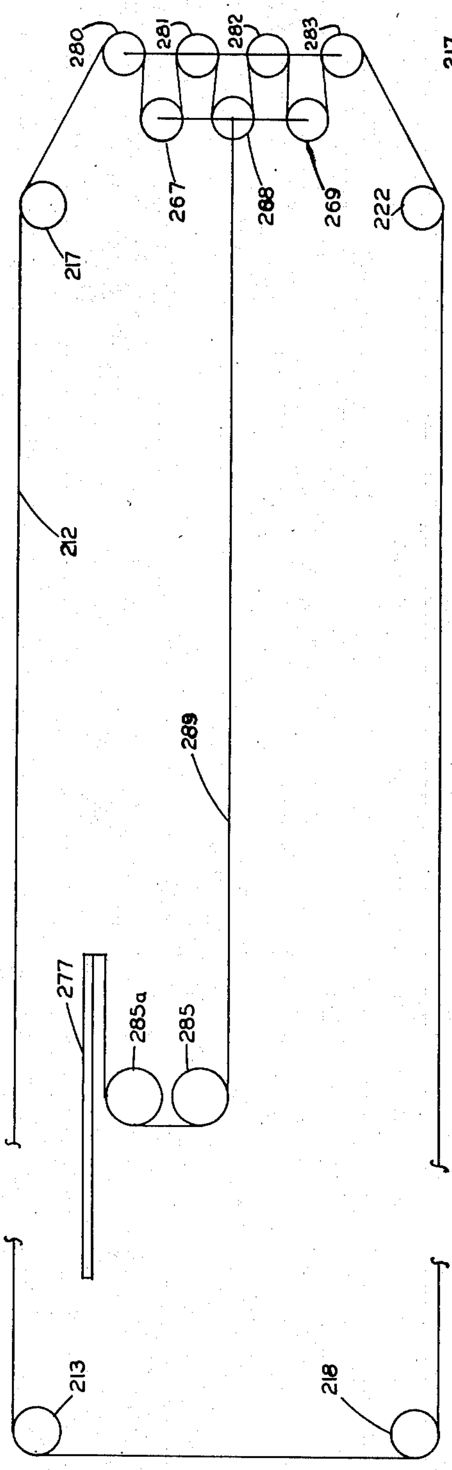
Fig. 19 is a similar diagrammatic view having however a fragment omitted and showing the relationship of the parts when the conveyor of Figs. 10 to 17 inclusive is fully extended.
Figure 18:
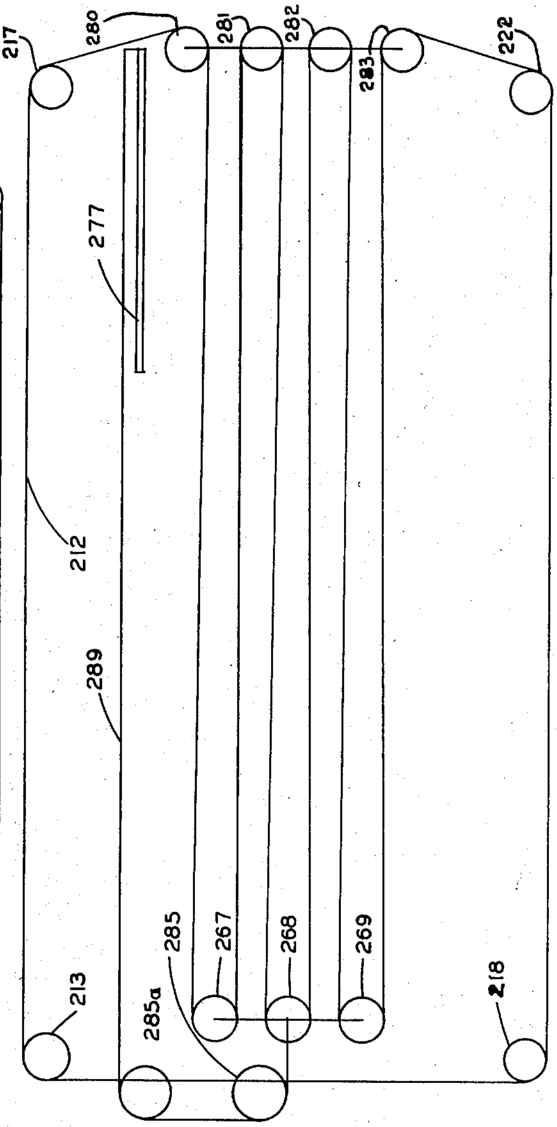
Fig. 18 is a diagrammatic view showing the essential portions of the conveyor of Figs. 10 to 17 inclusive when compacted.

In Figs. 18 and 19 I have illustrated diagrammatically the compacted and extended conditions of the embodiment illustrated in Figs. 10 to 17 inclusive. It may be seen in Fig. 18 that in the compacted position the arm 277 has through the chain 289 pulled the assembly consisting of the rollers 267, 268 and 269 away from the rollers 280, 281, 282 and 283 and thus absorbed six lengths of the conveyor belt so that the operative portion of the conveyor belt 212 is shortened. In Fig. 19 in the extended condition of the conveyor, the arm 277 has, through the chain 289, allowed the assembly consisting of the rollers 267, 268 and 269 to approach close to the rollers 280, 281, 282 and 283 so that little of the belt is absorbed when the conveyor is extended. In Fig. 19 the arm 277 has been shown above the chain 289 instead of below as in Fig. 18 merely for the purpose of ease of showing its position when the conveyor is extended.

Figure 10:
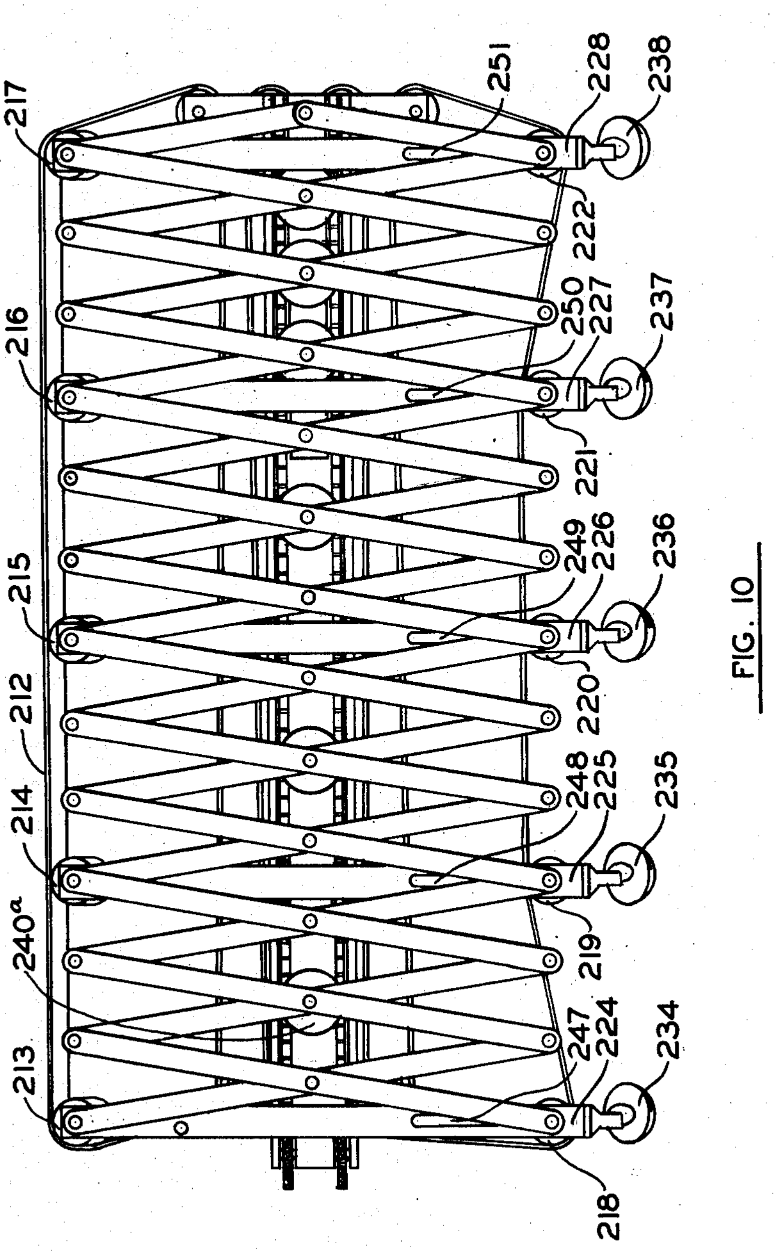
Fig. 10 is a view in side elevation of another type of conveyor constructed according to my invention.

The operation of the embodiments of Figs. 10 to 19 is similar to the operation of the previously described embodiments. The conveyor is positioned adjacent a coal mining machine (if the conveyor is to be used for such a purpose) in its contracted position as shown in Fig. 10; the fixed end (which may be either end, but which I prefer to consider the end with the "fixed" rollers; i. e., the right end in the drawings) is placed adjacent to a receptacle such as a coal car, and the movable (opposite) end is positioned adjacent to a coal mining machine. The belt 212 is driven in any desired manner so that the upper layer moves from the coal mining machine toward the receptacle thus conveying the coal thereto. As the machine cuts into the coal, the movable end of the conveyor follows up. Movement of the movable end of the conveyor extends the conveyor, spreading the lazy tongs linkage 241 and separating the uprights 224, 225, etc. The linkage moves proportionately so that the point 286 and the support 277 moves one-third as fast as the movable end and thus pulls the chains 288 and 289 and the unit 260 at the same rate. This exactly takes up the slack in the belt 212 and maintains a uniform tension on the belt 212 as the conveyor is extended.

Figure 20:
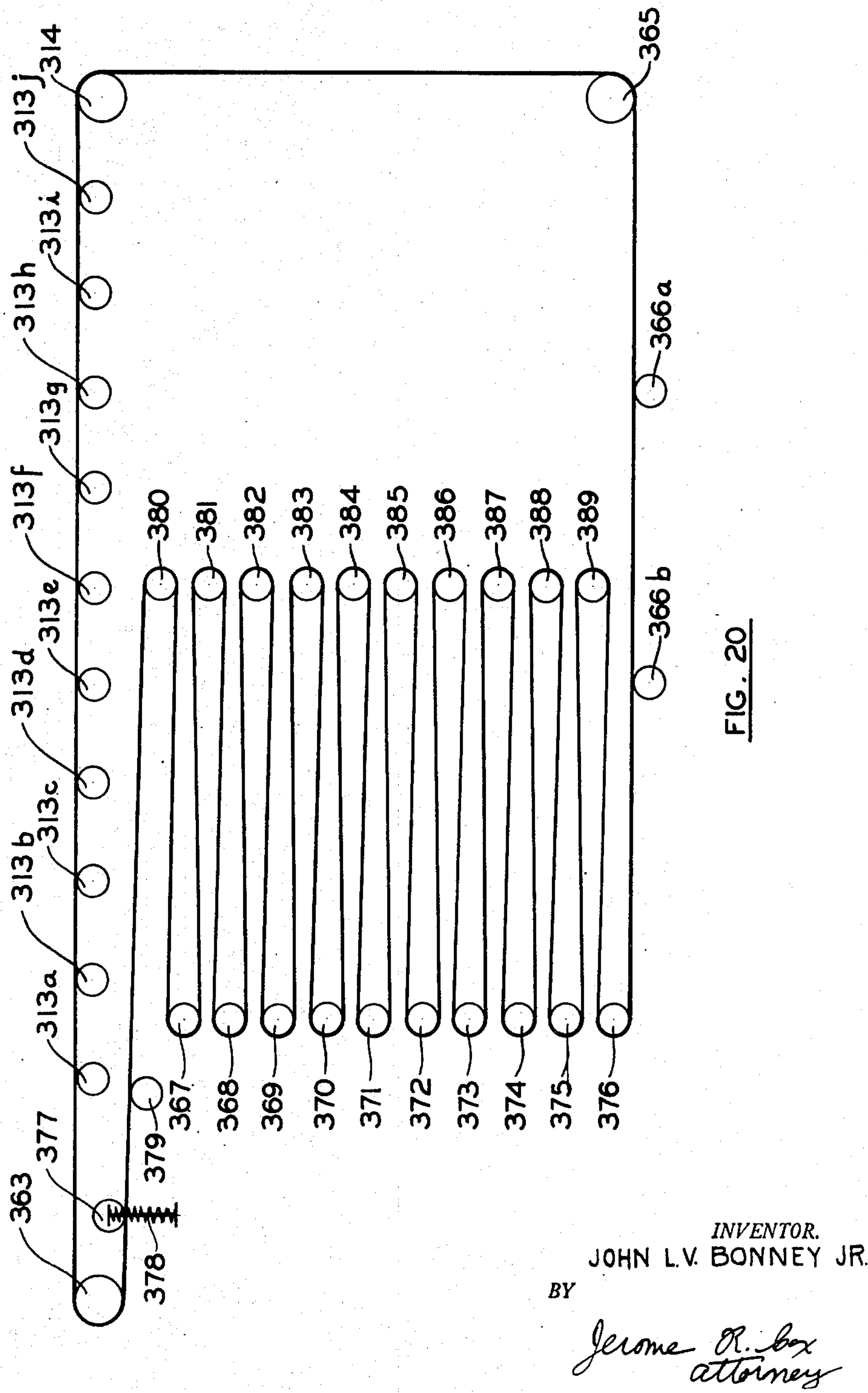
Fig. 20 is a diagrammatic view of another embodiment of my invention similar in most respects to the embodiment illustrated in Figs. 7 to 9 inclusive.
Figure 21:
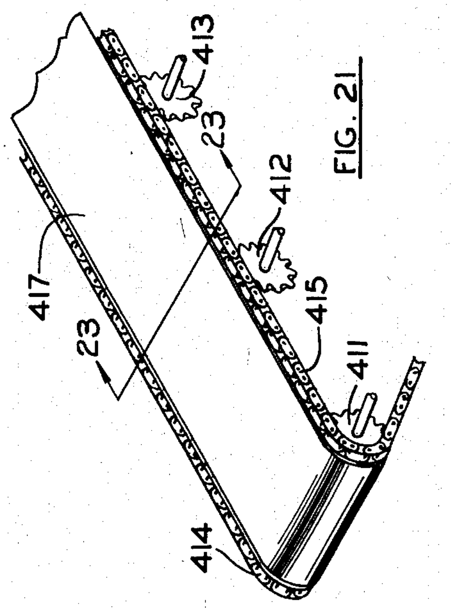
Fig. 21 is a fragmentary view in perspective of a portion of a conveyor mainly intended to illustrate a different form of belt.
Figure 22:
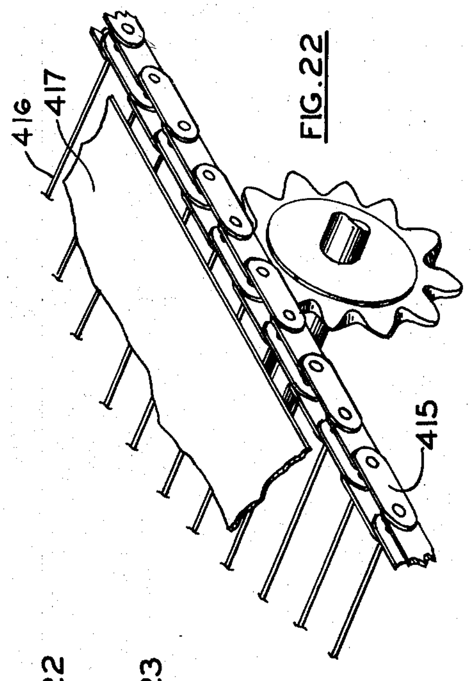
Fig. 22 is a perspective view on a relatively large scale of a fragment of the conveyor shown in Fig. 21.

In Fig. 20 I have illustrated diagrammatically another embodiment of my invention similar to the embodiment shown in Figs. 1 to 9 inclusive, but providing rollers for supporting the return portion of the belt. Thus the belt 212 through its upper operative portion is supported by the rollers 363, 313*a*, 313*b*, 313*c*, 313*d*, 313*e*, 313*f*, 313*g*, 313*h*, 313*i*, 313*j* and 314 and through its lower return portion goes around roller 365 and is supported by rollers 366*a*, and 366*b*, etc. Additional rollers such as 366*a* and 366*b* may be provided all carried by the lower ends of struts such as struts 24 to 33 inclusive. After passing around the roller 363 the roller may pass under an idler roller 377 having a spring 378 which acts always to maintain the belt taut and then over a roller 379 and around the fixed idler rollers 380, 381, 382, 383, 384, 385, 386, 387, 388 and 389 and the movable idler rollers 367, 368, 369, 370, 371, 372, 373, 374, 375, 376. This arrangement has the advantage that a better support is provided for the return portion of the belt by the rollers 366*a* and 366*b*, etc. than may conveniently be provided for example for the length of belt 12 between the rollers 23 and 67.

In Figs. 21, 22, 23 and 24, I have illustrated an alternative form of belt which is especially adapted for use with my improved conveyor, but which is also usable in other connections. This improved belt is carried as by sprockets 411, 412, 413 and corresponding sprockets on the opposite side of the conveyor and includes a pair of chains 414 and 415. Each of the links of the chain support one end of one of a series of wires or cables such as the wire 416. Each wire extends across the conveyor to a link on the chain on the other side of the conveyor and thus each of the wires is supported by the two chains. These wires, extending crosswise of the conveyor, support a relatively light belt 417 on which the coal or other material being transported is adapted to ride. The wires are slack and thus the belt is a troughing belt in which the coal rides.

Figures 23, 24:
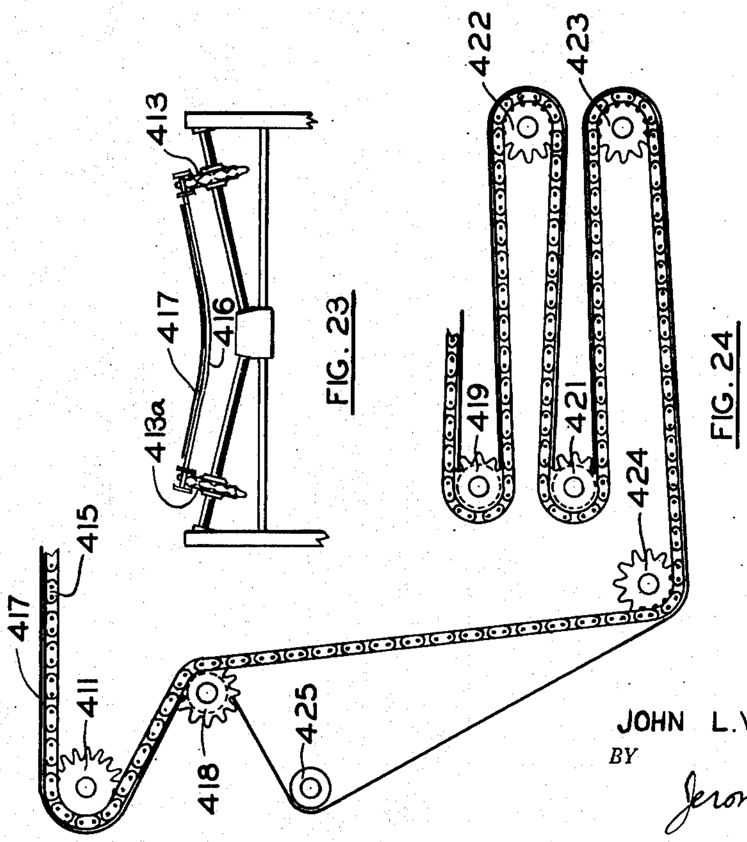
Fig. 23 is a view in vertical section of the conveyor illustrated in Fig. 21.
Fig. 24 is a diagrammatic view illustrating the arrangement of sprockets and rollers desirable in mounting the belt illustrated in Figs. 21 to 23, inclusive.

As shown in Fig. 24 additional idler sprockets 418, 419, 421, 422, 423, 424, etc. may be provided. Some of these sprockets such as the sprockets 418, 419 and 421 are provided also with rollers for the belt. Thus at 419 and 421 and at 425 rollers are provided so that the belt will be maintained taut.

The operation of the embodiment shown in Figs. 21 to 24 inclusive is exactly the same as the operation of the embodiments shown in Figs. 1 to 9 and Fig. 20.

It is to be understood that the above described embodiments of my invention are for the purpose of illustration only and various changes may be made therein without departing from the spirit and scope of the following claims.

I claim:

1. An extensible linkage having a movable end, and a fixed end and comprising a fixed frame; a movable frame; a plurality of pairs of levers including a pair of levers pivotally connected to said movable end, a second pair of levers pivotally connected to said fixed end, and a plurality of pairs of levers intermediate said first named pair of levers and said second named pair of levers; pivotal connections between the levers of each pair of levers at the approximate centers of said levers; pivotal connections between one end of each of said second named pair of levers and the fixed frame; pivotal connections between the opposite ends of said second named pair of levers and the adjacent ends of the adjacent intermediate pair of levers; pivotal connections between one end of each lever of the other pairs of levers and an end of one of the next adjacent pairs of levers; support rollers carried by some of the upper pivotal connections between adjacent pairs of levers, an endless belt passing over said support rollers; a fixed set of belt take-up rollers carried by said fixed frame and over which said belt also passes; a movable set of belt take-up rollers carried by said movable frame and over which said belt also passes; and means for moving said movable frame and said movable set of belt take-up rollers concurrently and equidistantly with the movement of one of said support rollers.

2. An extensible linkage having a movable end, and a fixed end and comprising a fixed frame; a movable frame; a plurality of pairs of levers including a pair of levers pivotally connected to said movable end, a second pair of levers pivotally connected to said fixed end, and intermediate pairs of levers intermediate said first named pair of levers and said second named pair of levers; pivotal connections between the levers of each pair of levers at the approximate centers of said levers; pivotal connections between one end of each of said second named pair of levers and the fixed frame; pivotal connections between the opposite ends of said second named pair of levers and the adjacent ends of the adjacent intermediate pair of levers; pivotal connections between one end of each lever of the other pairs of levers and an end of one of the next adjacent pairs of levers; support rollers carried by at least some of the upper pivotal connections between adjacent pairs of levers movable at different rates of movement but each movable at a rate of movement which bears a definite ratio to the rate of movement of each other support roller, an endless belt passing over said support rollers; a fixed set of belt take-up rollers carried by said fixed frame and over which said belt also passes; a movable set of belt take-up rollers carried by said movable frame and over which said belt also passes; and means for moving said movable frame and said movable set of belt take-up rollers concurrently at a rate equal to the rate of movement of one of said support rollers and equidistantly with the movement of said support rollers.

3. A conveyor comprising an extensible linkage having a movable end, and a fixed end and comprising a fixed frame; a movable frame; a plurality of pairs of levers including a pair of levers pivotally connected to said movable end, a second pair of levers pivotally connected to said fixed end, and a plurality of intermediate pairs of levers positioned between said first named pair of levers and said second named pair of levers; pivotal connections between the lever of each pair of levers at the approximate centers of said levers; pivotal connections between one end of each of said second named pair of levers and the fixed frame; pivotal connections between the opposite ends of said second named pair of levers and the adjacent ends of the adjacent intermediate pair of levers; pivotal connections between one end of each lever of the other intermediate pairs of levers and an end of one of the next adjacent pairs of levers; support rollers carried by at least some of the upper pivotal connections between adjacent pairs of levers movable at different rates of speed but each movable at a rate of speed which bears a definite ratio to the rate of speed of each other support roller, an endless belt passing over said support rollers; a fixed set of belt take-up rollers carried by said fixed frame and over which said belt also passes; a movable set of belt take-up rollers carried by said movable frame and over which said belt also passes; and means for moving said movable frame and said movable set of belt take-up rollers concurrently with the movement of one of said support rollers and at a rate equal to the rate of movement of said roller.

4. An extensible linkage having a movable end, and a fixed end and comprising a fixed frame; a movable frame; a plurality of pairs of levers including a pair of levers pivotally connected to said movable end, a second pair of levers pivotally connected to said fixed end and intermediate pairs of levers positioned between said first named pair of levers and said second named pair of levers; each pair of levers being pivotally connected at an intermediate point and each intermediate lever being pivotally connected to the two pairs of levers adjacent thereto; pivotal connections between the adjacent end of each of said second named pair of levers and the fixed frame; pivotal connections between the opposite ends of said second named pair of levers and the adjacent ends of the adjacent intermediate pair of levers; pivotal connections between the adjacent end of each of the levers of each of the intermediate pairs of levers and the adjacent ends of the levers of each of the next adjacent pairs of levers; support rollers carried by at least some of the upper pivotal connections between adjacent pairs of levers; an endless belt passing over said support rollers; a fixed set of belt take-up rollers carried by said fixed frame and over which said belt also passes; a movable set of belt take-up rollers carried by said movable frame and over which said belt also passes; and means for moving said movable frame and said movable set of belt take-up rollers concurrently and equidistantly with the movement of one of said support rollers.

5. A conveyor comprising an extensible linkage having a movable end, and a fixed end and comprising a fixed frame; a movable frame adapted to be moved to extended and contracted positions relative to said fixed frame; a plurality of pairs of levers including a pair of levers pivotally connected to said movable end, a pair of levers pivotally connected to said fixed end and intermediate pairs of levers positioned between said first named pair of levers and said second named pair of levers; pivotal connections between the lever of each pair of levers at the approximate centers of said levers; pivotal connections between one end of each of said second named pair of levers and the fixed frame; pivotal connections between the opposite ends of said second named pair of levers and the adjacent ends of the adjacent intermediate pair of levers; pivotal connections between one end of each lever of the other intermediate pairs of levers and an end of one of the next adjacent pairs of levers; support rollers carried by at least some of the upper pivotal connections between adjacent pairs of levers; an endless belt for conveying material passing over said support rollers; and means for maintaining substantially constant tension in the belt regardless of movement of the linkage comprising a fixed set of belt take-up rollers carried by said fixed frame and over which said belt also passes, a movable set of belt take-up rollers carried by said movable frame and over which said belt also passes and a mounting for moving said movable frame concurrently with the movement of one of said support rollers and in the same direction as said support roller moves.

6. The structure of claim 1 in which there are two sets of rollers and the number of rollers in one of said sets is equal to the number of rollers in the other said set plus one.

7. An extensible linkage having a movable end, and a fixed end and comprising a fixed frame; a plurality of pairs of levers including a pair of levers pivotally connected to said movable end, a second pair of levers pivotally connected to said fixed end, and intermediate pairs of levers positioned between said first named pair of levers and said second name pair of levers; pivotal connections between the levers of each pair of levers at the approximate centers of said levers; pivotal connections between the adjacent end of each of said second named pair of levers and the fixed frame; pivotal connections between the adjacent ends of said second named pair of levers and the adjacent ends of the adjacent intermediate pair of levers; pivotal connections between the adjacent end of each of the levers of each of the intermediate pairs of levers and the adjacent ends of the levers of each of the next adjacent pairs of levers; support rollers carried by at least some of the upper pivotal connections between adjacent pairs of levers, an endless belt passing over said support rollers; a fixed set of belt take-up rollers carried by said fixed frame and over which said belt also passes; a movable frame supported and positioned intermediate the ends of said linkage by the pivotal connection between the levers of two adjacent pairs of levers; and a movable set of belt take-up rollers carried by said movable frame and over which said belt also passes.

8. The structure of claim 4 in which one of said sets of rollers is connected by a chain with one of said levers at a point intermediate the ends of said linkage.

9. The structure of claim 4 in which one of said sets of rollers is connected by a chain with one of said levers at a point intermediate the ends of said linkage, and in which there is provided a bar secured to one end of said linkage, and a sprocket secured to said bar over which said chain passes.

10. A conveyor comprising an extensible linkage having a movable end, and a fixed end and comprising a fixed frame; a movable frame adapted to be moved to extended and contracted positions relative to said fixed frame; a plurality of pairs of levers including a pair of levers pivotally connected to said movable end, a second pair of levers pivotally connected to said fixed end, and intermediate pairs of levers positioned between said first named pair of levers and said second named pair of levers; pivotal connections between the lever of each pair of levers at the approximate center of said levers; pivotal connections between one end of each of said second named pair of levers and the fixed frame; pivotal connections between the opposite ends of said second named pair of levers and the adjacent ends of the adjacent intermediate pair of levers; pivotal connections between one end of each lever of the other intermediate pairs of levers and an end of one of the next adjacent pairs of levers; support rollers carried by at least some of the upper pivotal connections between adjacent pairs of levers; an endless belt for conveying material passing over said support rollers; and means for maintaining substantially constant tension in the belt as the linkage moves and for letting the belt out as the conveyor is extended comprising a fixed set of belt take-up rollers carried by said fixed frame and over which said belt also passes, a movable set of belt take-up rollers carried by said movable frame and over which said belt also passes and a mounting for moving said movable frame away from the fixed frame concurrently and equidistantly with the movement of one of said support rollers and in the same direction as said support roller moves.

11. The structure of claim 5 in which the mounting is moved away from the fixed portion of the frame to take up slack as the conveyor is contracted.

References Cited in the file of this patent

UNITED STATES PATENTS

| Number | Name | Date |
|---|---|---|
| 895,776 | Liggett | Aug. 11, 1908 |
| 1,453,393 | Jessen | May 1, 1923 |
| 1,669,613 | Greer | May 15, 1928 |
| 1,935,734 | Twomley | Nov. 21, 1933 |
| 1,937,925 | Tolf | Dec. 5, 1933 |
| 2,053,322 | Cavagnaro | Sept. 8, 1936 |
| 2,166,447 | Ruppenthal | July 18, 1939 |

FOREIGN PATENTS

| Number | Country | Date |
|---|---|---|
| 360,134 | Great Britain | Nov. 5, 1931 |